United States Patent
Nakamura et al.

(10) Patent No.: US 8,523,279 B2
(45) Date of Patent: Sep. 3, 2013

(54) VEHICLE SEAT ASSEMBLY AND HEATER UNIT TO BE USED THEREFOR

(75) Inventors: Takeshi Nakamura, Yokohama (JP);
Akitoshi Yamashita, Yokohama (JP);
Hiroshi Yagame, Yokohama (JP);
Takanori Nagai, Hamamatsu (JP)

(73) Assignees: NHK Spring Co., Ltd., Yokohama-shi (JP); Kurabe Industrial Co., Ltd., Hamamatsu-shi (JP)

( * ) Notice: Subject to any disclaimer, the term of this patent is extended or adjusted under 35 U.S.C. 154(b) by 672 days.

(21) Appl. No.: 12/777,628

(22) Filed: May 11, 2010

(65) Prior Publication Data

US 2010/0289303 A1 Nov. 18, 2010

(30) Foreign Application Priority Data

May 12, 2009 (JP) .................................. 2009-116022

(51) Int. Cl.
*A47C 7/72* (2006.01)

(52) U.S. Cl.
USPC .................................... 297/180.12; 297/180.1

(58) Field of Classification Search
USPC ............... 297/180.1, 180.12, 180.13, 180.14; 219/217, 529
See application file for complete search history.

(56) References Cited

U.S. PATENT DOCUMENTS

| 4,773,494 | A * | 9/1988 | Anderson ..................... 180/6.48 |
| 5,915,783 | A * | 6/1999 | McDowell et al. ...... 297/180.12 |
| 6,179,378 | B1 * | 1/2001 | Baumgartner et al. .. 297/180.12 |
| 7,244,914 | B2 * | 7/2007 | Yoneyama et al. ........... 219/545 |
| 7,478,869 | B2 * | 1/2009 | Lazanja et al. ........... 297/180.14 |
| 7,735,932 | B2 * | 6/2010 | Lazanja et al. ........... 297/452.47 |
| 2003/0111454 | A1 * | 6/2003 | Ishiyama et al. .............. 219/217 |
| 2007/0188007 | A1 * | 8/2007 | Lazanja et al. ........... 297/452.42 |
| 2009/0095725 | A1 * | 4/2009 | Ohashi et al. ................. 219/202 |
| 2009/0152908 | A1 * | 6/2009 | Lazanja et al. ........... 297/180.12 |

FOREIGN PATENT DOCUMENTS

JP  2003-174952 A  6/2003
JP  2007-035474 A  2/2007

* cited by examiner

*Primary Examiner* — David Dunn
*Assistant Examiner* — Erika Garrett
(74) *Attorney, Agent, or Firm* — Foley & Lardner LLP

(57) ABSTRACT

Disclosed is a vehicle seat assembly with built-in heater having a configuration to minimize formation of creases. The vehicle seat assembly of the present invention comprises a seat heater. The seat heater is structured as a unit and comprised of a substrate and a heating wire. The heating wire has a first heater section and a second heater section. In the first heater section, a part of the segments bent on the left side extend leftward across the center. In the second heater section, a part of the segments bent on the right side extend rightward across the center. These segments are overlapped when viewed in the vertical direction. This configuration minimizes formation of creases in the middle area.

12 Claims, 9 Drawing Sheets

VEHICLE SEAT ASSEMBLY AND HEATER UNIT TO BE USED THEREFOR

This application claims priority from Japanese Patent Application 2009-116022, filed May 12, 2009, which is incorporated herein by reference in its entirety.

BACKGROUND OF THE INVENTION

1. Field of the Invention

The present invention relates to a vehicle seat assembly and a heater unit to be used therefor, and in particular, relates to the heating wire layout of a heater to be mounted in the vehicle seat assembly.

2. Description of the Related Art

A vehicle seat assembly comprises a seat cushion having a seating surface on which a person (occupant) sits and a seat back on which the sitting person leans his or her back. The seat cushion and the seat back each comprise a frame, a soft pad surrounding the frame, and a trim cover covering the pad. To increase the comfort of the person, a vehicle seat assembly including a heater is known.

The heater is mounted in both or either one of the seat back and the seat cushion. Specifically, it is placed within the trim cover of the seat back or the seat cushion, and the warming power is controlled by operation of the user. In a typical seat assembly including a heater, a seat heater unit comprising a substrate and a heating wire laid out thereon is fastened within the trim cover.

FIG. 8 is a plan view illustrating an example of a seat heater unit to be mounted in a seat back. The heater unit 8 comprises a flexible sheet-like substrate 81 and a heating wire 82 fastened on the substrate 81. The heater unit 8 is secured between the trim cover and the pad in a seat back. FIG. 8 shows the front side of the heater unit 8, which is the shape of the heater unit 8 when the seat back is viewed from the foreside of a vehicle. The top and the bottom of FIG. 8 correspond to the top and the bottom of the seat assembly, respectively.

In FIG. 8, the upper part above the dashed divider line is placed in the front of the seat back and warms the occupant's body. The lower part below the dashed line is placed between the seat back and the seat cushion, or at the back of the seat back. As shown in FIG. 8, in the upper part above the dashed line, the heating wire 82 has a left-right symmetric form, and is not placed in the middle part which is provided between the right part 821 and the left part 822.

The space G0 in the middle part, where the heating wire 82 does not exist, extends vertically; its location corresponds to the middle in the horizontal direction of the seat back. A heater unit having another configuration is disclosed in Japanese unexamined patent application publication No. 2007-35474 (Arima et al.), for example. The heater unit disclosed in Arima et al. has a space (an area where a heating wire does not exist) between the right side and the left side of the heating wire layout like the heating wire layout shown in FIG. 8.

It is known that if the heater unit 8 is mounted in a seat assembly, the trim cover of the seat back may be creased. That can be found more noticeably in seat assemblies including a particular type of seat back. The inventors have found through their research that the crease is more likely to be formed if the curvature of the front side of the seat back is greater. FIG. 9 is a view illustrating the cross-sectional shape of the seat back pad 91, showing the cross-section of the seat back pad 91 cut perpendicularly to the vertical direction and viewed from the top.

As shown in FIG. 9, the seat back pad 9 (the seat back) in a seat assembly has a side (a front side) 91 curved outward and rearward for supporting the back of the occupant. A heater unit is bonded onto the curved front side 91 of the pad. As explained with reference to FIG. 8, the heating wire 82 does not exist in the space G0 of the heater unit 8. The part of the space G0 is composed of only a flexible substrate 81, so its stiffness is small.

When the heater unit 8 is bonded onto the curved pad, the middle part G0 of the heater unit 8 is likely to be creased. In particular, the small stiffness of the middle part G0 increases the likeliness. On the other hand, even if the heater unit 8 has been successfully bonded to the pad without creases, when the occupant moves with his or her back being in contact with the seat back, the heating wire 82 is gathered toward the middle to deform the heater unit 8, so the middle part G0 with small stiffness is likely to be creased, too. Accordingly, in a vehicle seat assembly with built-in heater, a heater structure is desired that hardly forms creases.

SUMMARY OF THE INVENTION

A heater unit to be used for a vehicle seat assembly according to an aspect of the present invention comprises a substrate; a first heater section composed of a single heating wire, extending in a first direction with multiple bends on the substrate; and a second heater section composed of a single heating wire, extending in the first direction with multiple bends on the substrate and provided at a location different in a second direction from the first heater section, the second direction being perpendicular to the first direction. The first heater section is formed by placing each of a plurality of segments bent on the second heater section side and each of a plurality of segments bent on the opposite side of the second heater section so as to be shifted in the first direction from each other and alternately connecting each of the plurality of segments bent on the second heater section side and each of the plurality of segments bent on the opposite side of the second heater section. The second heater section is formed by placing each of a plurality of segments bent on the first heater section side and each of a plurality of segments bent on the opposite side of the first heater section so as to be shifted in the first direction from each other and alternately connecting each of the plurality of segments bent on the first heater section side and each of the plurality of segments bent on the opposite side of the first heater section. At least a part of the plurality of segments bent on the second heater section side extend across the center in the second direction between the first heater section and the second heater section. At least a part of the plurality of segments bent on the first heater section side extend across the center in the second direction between the first heater section and the second heater section. Such a configuration minimizes formation of creases in a vehicle seat assembly with built-in heater.

Preferably, the part of the plurality of segments bent on the second heater section side are a plurality of segments bent on the second heater section side, the part of the plurality of segments bent on the first heater section side are a plurality of segments bent on the first heater section side, and each of the segments bent on the second heater section side and each of the segments bent on the first heater section side extending across the center are placed alternately in the first direction. This configuration minimizes formation of creases in a vehicle seat assembly with built-in heater more effectively.

Preferably, the part of the segments bent on the second heater section side are at least partially overlapped with all the segments bent on the first heater section side located differently in the first direction therefrom when viewed in the first direction, and the part of the segments bent on the first heater section side are at least partially overlapped with all the segments bent on the second heater section side located differently in the first direction therefrom when viewed in the first direction. This configuration minimizes formation of creases in a vehicle seat assembly with built-in heater more effectively.

It is preferable that the first heater section and the second heater section constitute a part of a single heating wire. This leads to a more efficient configuration for a heater unit.

Preferably, a part of the plurality of segments bent on the second heater section side and a part of the plurality of segments bent on the first heater section side end before the center and there is a space therebetween. This configuration minimizes formation of creases in a vehicle seat assembly with built-in heater while saving the total length of the heating wire.

The following configuration is preferable. In the first heater section, each of the segments bent on the second heater section side and each of the segments bent on the opposite side of the second heater section are joined so as to form a bend. In the second heater section, each of the segments bent on the first heater section side and each of the segments bent on the opposite side of the first heater section are joined so as to form a bend. A space exists between the segments extended across the center and bent on the second heater section side and the segments extended across the center and bent on the first heater section side in the second heater section, and the space is located so as to overlap with the bends at the joints in the second heater section when viewed in the first direction. A space exists between the segments extended across the center and bent on the first heater section side and the segments extended across the center and bent on the second heater section side in the first heater section, and the space is located so as to overlap with the bends at the joints in the first heater section when viewed in the first direction. This configuration minimizes the likeliness of break of the heating wire.

A vehicle seat assembly according to another aspect of the present invention comprises a seat back covered with a seat back trim cover, a seat cushion covered with a seat cushion trim cover, and a heater unit mounted within the seat back trim cover or the seat cushion trim cover. The heater unit comprises a first heater section composed of a single heating wire, extending in a first direction with multiple bends on the substrate, and a second heater section composed of a single heating wire, extending in the first direction with multiple bends on the substrate and provided at a location different in a second direction from the first heater section, the second direction being perpendicular to the first direction. The first heater section is formed by placing each of a plurality of segments bent on the second heater section side and each of a plurality of segments bent on the opposite side of the second heater section so as to be shifted in the first direction from each other and alternately connecting each of the plurality of segments bent on the second heater section side and each of the plurality of segments bent on the opposite side of the second heater section. The second heater section is formed by placing each of a plurality of segments bent on the first heater section side and each of a plurality of segments bent on the opposite side of the first heater section so as to be shifted in the first direction from each other and alternately connecting each of the plurality of segments bent on the first heater section side and each of the plurality of segments bent on the opposite side of the first heater section. At least a part of the plurality of segments bent on the second heater section side extend across the center in the second direction between the first heater section and the second heater section. At least a part of the plurality of segments bent on the first heater section side extend across the center in the second direction between the first heater section and the second heater section. Such a configuration minimizes formation of creases in a vehicle seat assembly with built-in heater.

The present invention minimizes formation of creases in a vehicle seat assembly with built-in heater. The above and other objects, features and advantages of the present invention will become more fully understood from the detailed description given hereinafter and the accompanying drawings which are given by way of illustration only, and thus are not to be considered as limiting the present invention.

DESCRIPTION OF THE PREFERRED EMBODIMENTS

Figure 1:
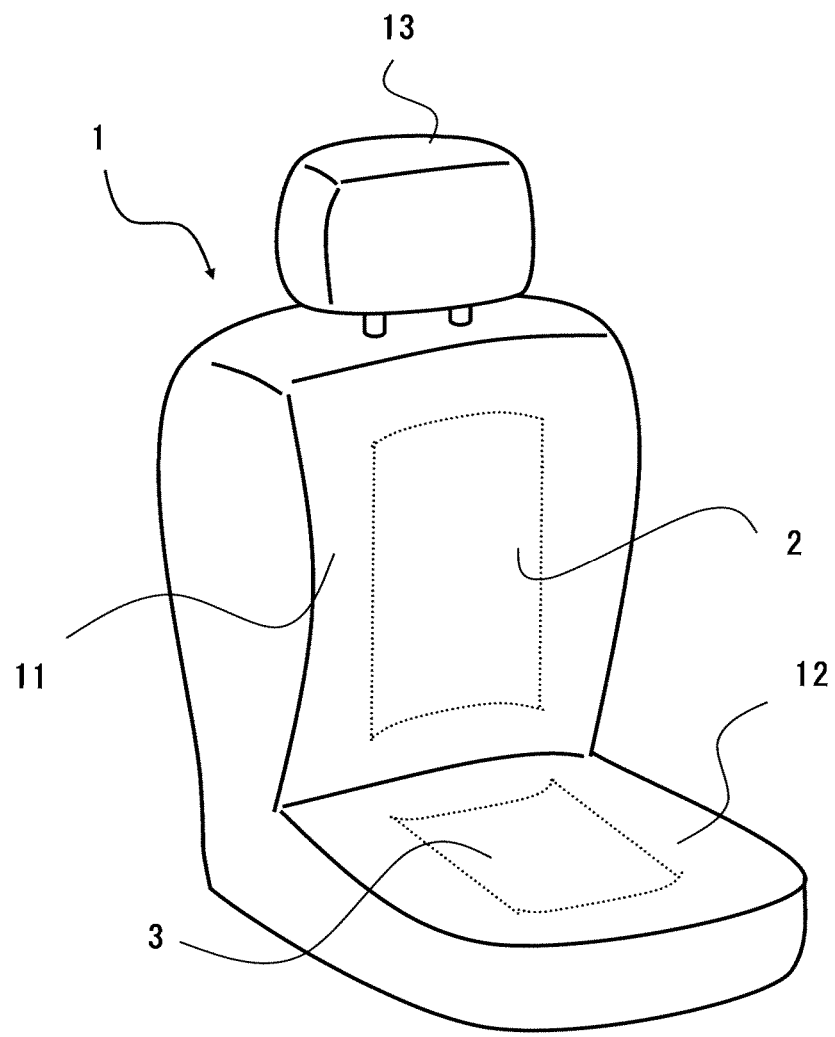
FIG. 1 is a perspective view illustrating the configuration of a vehicle seat assembly according to a preferred embodiment of the present invention.

Hereinafter, a preferred embodiment to which the present invention has been applied will be described with reference to the accompanying drawings. For clarity of explanation, the following description and the drawings may contain omissions and simplifications as appropriate. Throughout the drawings, like components are denoted by like reference numerals or symbols, and their repetitive description may be omitted if not necessary. A vehicle seat assembly according to the present embodiment includes a seat heater. The seat heater warms up the user (the occupant) to increase the comfort while he or she is sitting on the seat. The present embodiment has a feature in the structure of the seat heater to be mounted in a vehicle seat assembly, and particularly in its heating wire layout. The seat heater structure of the present embodiment is particularly useful to a heater to be mounted in a seat back, but may be applied to a seat heater to be mounted in a seat cushion.

Before describing the seat heater according to the present embodiment in detail, the structure of a vehicle seat assembly in which the seat heater is mounted will be described. FIG. 1 is a perspective view illustrating the entire configuration of a vehicle seat assembly to which the heater of the present invention is applicable. The vehicle seat assembly 1 comprises a seat cushion 12 having a sitting surface on which a person (an occupant) sits, and a seat back 11 on which the sitting person leans his or her back. Onto the top of the seat back 11, a head rest 13 is attached.

In the present specification, the seat cushion 12 side of the seat back 11 is defined as the front side, and the opposite side is defined as the rear side or the back side. In addition, the seat cushion 12 side is defined as the lower side, and the head rest 13 side is defined as the upper side. These correspond to the front and the back sides, and the upper and the lower sides of the sitting user, and further, correspond to the front and rear sides, and the upper and lower sides of the vehicle. FIG. 1 shows a seat assembly for a single person, but the present invention may be applied to a seat assembly for two or three persons.

A seat heater 2 is attached to the seat back 11. In addition, a seat heater 3 is attached to the seat cushion 12. In a preferred configuration, the seat heater 2 and the seat heater 3 are heater units each comprised of a planar substrate and a heating wire held by the substrate. The seat heater 2 and the seat heater 3 may have the same structure or different structures. The seat assembly 1 may have only either one of the two seat heaters 2 and 3.

The seat back 11, the seat cushion 12, and the head rest 13 each comprises an inner frame of the structural frame, a pad which is made of a soft cushioned material and covers the inner frame, and a trim cover for covering the pad. A common frame is made of steel and a pad is secured to the frame so as to cover the frame's front side. A common pad is made of resin foam like urethane foam and is made thick. The surface of the pad is additionally covered with a trim cover made of cloth or leather.

Commonly, the heater units 2 and 3 are each secured between the pad and the trim cover. As described above, the seat heaters 2 and 3 are configured to be heater units, which are components independent from the trim covers and the pads. The present embodiment has a feature in the heating wire layout of a seat heater. The seat back 11 or the seat cushion 12 may be formed with a heating wire secured to the inner surface of the trim cover or held by the pad. However, for better heat conductivity to the user, better sitting comfort, and simpler manufacture, it is preferable that the heater unit be secured to the front side of the pad.

Figure 2:
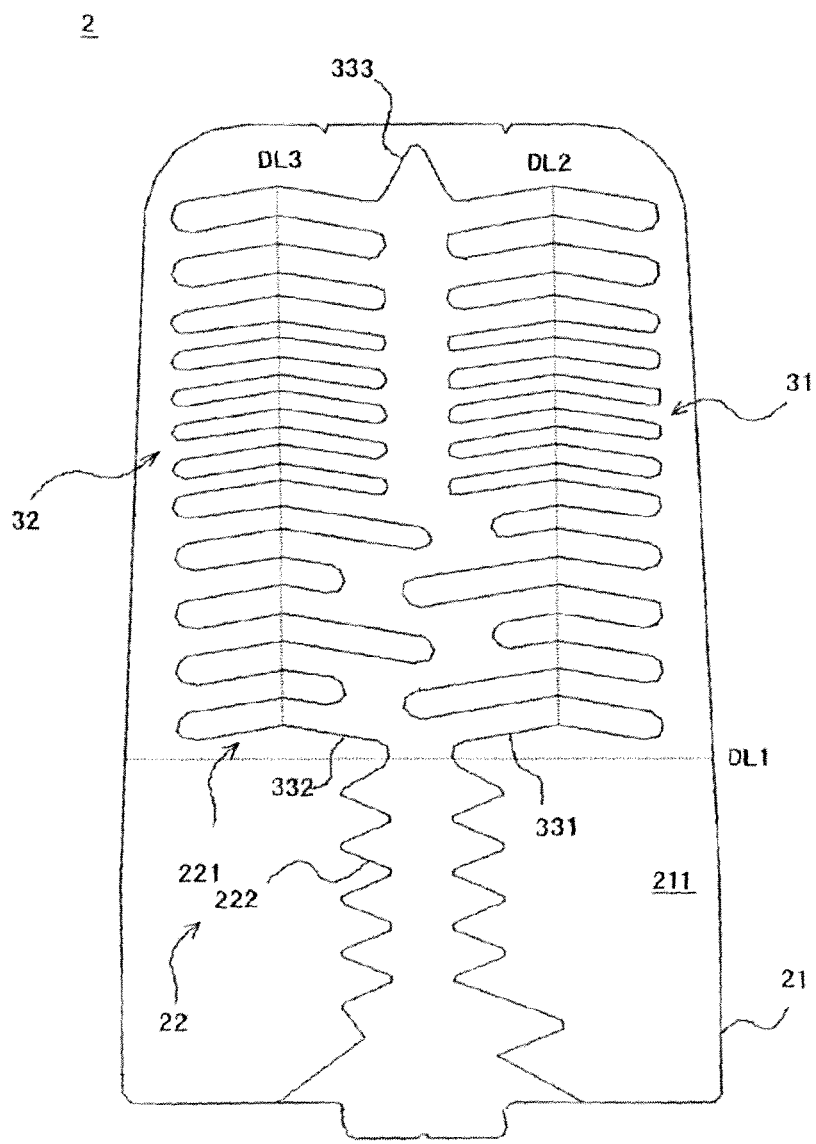
FIG. 2 is a plan view illustrating a structure of a heater unit (seat heater) to be mounted in a seat back in the preferred embodiment.

Hereinafter, the structure of the seat heater 2 will be described in detail. As described above, the seat heater 2 is preferably structured as a unit. FIG. 2 is a plan view illustrating the structure of a heater unit 2 (a seat heater 2) to be mounted in a seat back 11. FIG. 2 is a view of the heater unit 2 which has been mounted in the seat back 11 when viewed from the front side of the vehicle, and the top and the bottom of FIG. 2 correspond to those of the seat assembly 1. The seat heater 2 consists of a planar substrate 21 and a heating wire 22 held by the substrate 21.

The substrate 21 is a thin planar member and has a front side 211 and a back side (not shown) with a large area. The front side 211 and the back side are the principal surfaces of the substrate 21 and they are substantially rectangular. The substrate 21 is made of multilayered urethane, for example, and a heating wire 22 is held between layers. In this configuration, the heating wire 22 is not exposed, but for explanatory purposes, the figure shows the heating wire 22. Apart of the layers may be made of urethane foam. Otherwise, as far as the heating wire 22 can be held, the substrate 21 may be single layered or made of a material other than urethane. A typical substrate 21 is planar rectangular, but other shapes may be acceptable.

As described above, the heater unit 2 is held between the front side of the seat back pad and the inner surface of the seat back trim cover. In FIG. 2, the upper part above the dashed divider line DL1 is placed in the front of the seat back 11 and the lower part is placed at the lower end of the seat back 11, between the seat back 11 and the seat cushion 12, or at the back of the seat back 11. Accordingly, the heating wire 22 in the upper part above the dashed line can warm the back of the occupant.

The heating wire 22 consists of a main heater part 221 for warming the occupant's back and a transmitter part 222 for transmitting electric power to the main heater part 221. The transmitter part 222 is connected with a transmission line from a power supply at the back of the seat back. The transmitter part 222 is composed of a heating wire, but substantially does not have a function to warm the occupant's back. The heating function to warm the occupant's back is provided by the main heater part 221. The transmitter part 222 repeats bending and extends in the vertical direction, but its width (the dimension in the horizontal direction) is much less than that in the main heater part 221 and the interval in the vertical direction between bends is larger than that in the main heater part 221.

The main heater part 221 consists of a plurality of sections. Specifically, the main heater part 221 comprises a first heater section 31 on the right side of FIG. 2 and a second heater section 32 on the left side of FIG. 2. In this manner, the first heater section 31 and the second heater section 32 are arranged in the horizontal direction. The upper ends of the first heater section 31 and the second heater section 32 are connected by an interconnector section 333. The lower end of the first heater section 31 and one of the upper ends of the transmitter part 222 are connected by a first connector section 331. The lower end of the second heater section 32 and the other of the upper ends of the transmitter part 222 are connected by a second connector section 332. The interconnector section 333 is located between the dashed lines DL2 and DL3. The first connector section 331 is located between the right end of the dashed line DL1 and the lower end of the dashed line DL2. The second connector section 332 is located between the left end of the dashed line DL1 and the lower end of the dashed line DL3.

In the preferred configuration shown in FIG. 2, the main heater part 221 is composed of a single heating wire, and the first heater section 31, the second heater section 32, the first connector section 331, the second connector section 332, and the interconnector section 333 constitute part of the heating wire 22. The transmitter part 222 is composed of two lines of heating wire; the upper end of one of the lines is connected with the lower end of the first heater section 31 and the upper end of the other line is connected with the lower end of the second heater section 32.

The first heater section 31 is composed of a single heating wire, which extends in the vertical direction (a first direction) with multiple bends. The vertical direction is perpendicular to the horizontal direction (a second direction). Specifically, the first heater section 31 has a plurality of segments bent on the second heater section 32 side (the left side in FIG. 2). Furthermore, the first heater section 31 has a plurality of segments bent on the opposite side of the second heater section 32 (the right side in FIG. 2). Each left bent segment and each right bent segment are shifted in the vertical direction from each other and are connected alternately to form the first heater section 31.

Figure 3:
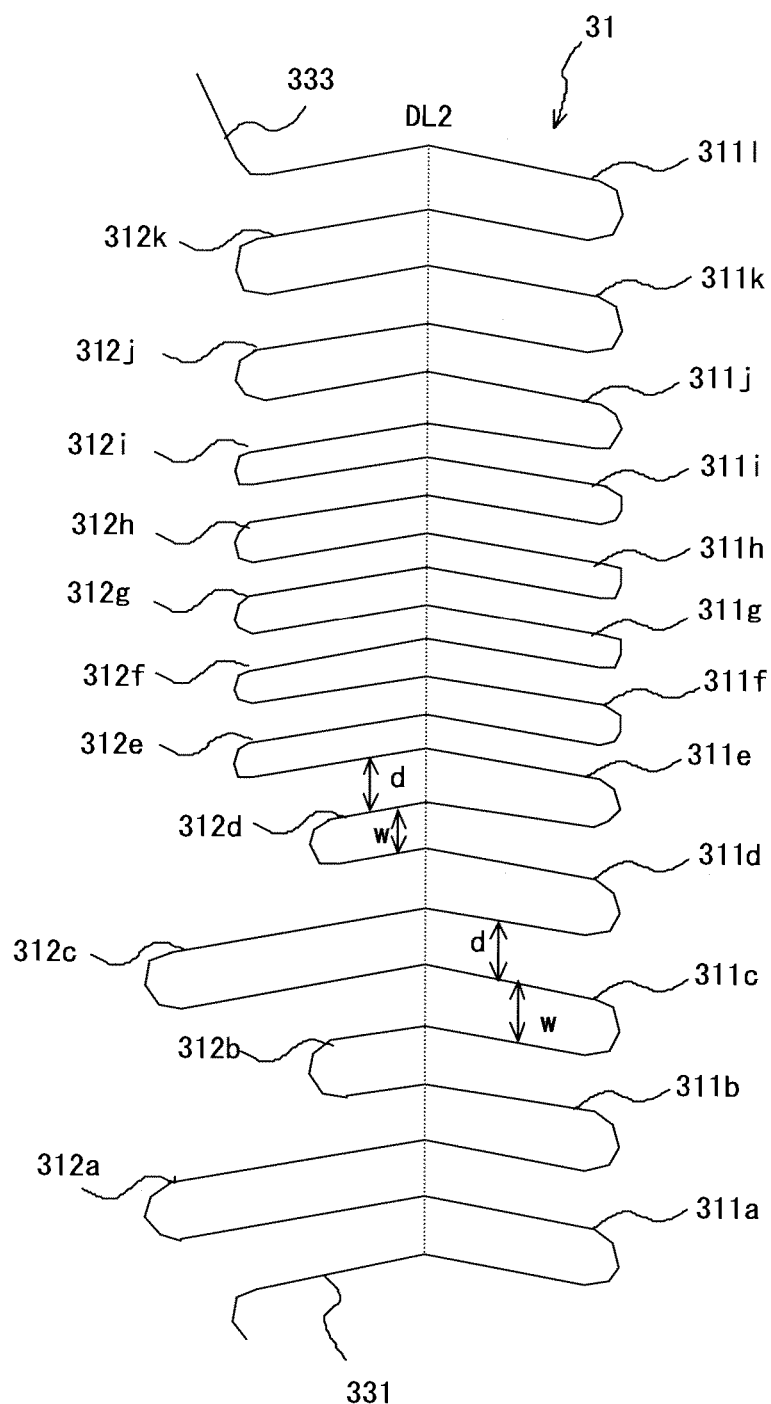
FIG. 3 is an enlarged view of a first heater section according to the preferred embodiment.

The configuration of the first heater section 31 will be described more specifically. FIG. 3 is an enlarged view of the first heater section 31. The first heater section 31 has twelve right bent segments 311a to 311l. In addition, the first heater section 31 has eleven left bent segments 312a to 312k. The right bent segments 311a to 311l are placed separately from one another in this order from the bottom to the top in the vertical direction. The left bent segments 312a to 312k are also placed separately from one another in this order from the bottom to the top in the vertical direction. The left ends of the right bent segments 311a to 311l and the right ends of the left bent segments 312a to 312k are located on the dashed line DL2.

In this preferred configuration, each of the right bent segments 311a to 311l is U-shaped with straight parallel upper and lower lines and a circular arc bend formed on the right side. The upper line and the lower line are slanted toward the lower right. The upper lines of the right bent segments 311a to 311l have the same length, and the lower lines thereof have the same length, too. The right ends of the bent segments 311a to 311l are aligned vertically. The upper lines of the segments 311a to 311l are parallel, and the lower lines thereof are parallel, too. In the right bent segments 311a to 311l, the length of the upper and lower lines and the location of the right ends may be changed depending on the design.

Each height between a lower line and an upper line (one is denoted by w) is the same in the lower segments 311a to 311d and the upper segments 311k and 311l. Similarly, each interval between two adjacent segments (one is denoted by d) is the same in the lower segments 311a to 311d and the upper segments 311k and 311l, too. In the middle segments 311f to 311i, each height is the same and each interval between two adjacent segments is the same, but they are smaller than those in the upper segments 311k and 311l and the lower segments 311a to 311d. Each height of the segments 311e and 311j is larger than that in the middle segments 311f to 311i and smaller than that in the lower segments 311a to 311d and the upper segments 311k and 311l. Variation in the height and the interval between two segments allows efficient and suitable warming of the occupant's back.

In similar, each of the left bent segments 312a to 312k is U-shaped with straight parallel upper and lower lines and a circular arc bend formed on the left side. The upper line and the lower line are slanted toward the lower left. The upper lines of the left bent segments 312a and 312c have the same length, and the lower lines thereof have the same length, too. The left ends of the bent segments 312a and 312c are aligned vertically. The upper lines of the left bent segments 312b and 312d have the same length, and the lower lines thereof have the same length, too. The left ends of the bent segments 312b and 312d are aligned vertically. The upper lines of the left bent segments 312e to 312k have the same length, and the lower lines thereof have the same length, too. The left ends of the bent segments 312e to 312k are aligned vertically.

The upper lines of the segments 312a to 312l are parallel, and the lower lines thereof are parallel, too. The segments 312a and 312c have the longest upper and lower lines, the segments 312b and 312d have the shortest upper and lower lines, and the segments 312e to 312k have upper and lower lines with an intermediate length. With regard to the left ends, the segments 312a and 312c are located closest to the center, the segments 312b and 312d are located farthest from the center, and the segments 312e to 312k are located therebetween.

Each height between a lower line and an upper line (one is denoted by w) is the same in the lower segments 312a to 312c and the upper segment 312k. Similarly, each interval between two adjacent segments (one is denoted by d) is the same in the lower segments 312a to 312c and the upper segment 312k, too. In the middle segments 312e to 312i, each height is the same and each interval between two adjacent segments is the same, but they are smaller than those in the upper segment 312k and the lower segments 312a to 312c.

Each height of the segments 312d and 312j is larger than that in the middle segments 312e to 312i and smaller than that in the lower segments 312a to 312c and the upper segment 312k. It is the same as the right bent segments that variation in the height and the interval between two segments allows efficient and suitable warming of the occupant's back. In the present configuration example, in the first heater section 31, all of the right bent segments and the left bent segments are larger in the horizontal direction than in the vertical direction (the height).

The right bent segments 311a to 311l are provided on the right side of the left bent segments 312a to 312k. The right bent segments 311a to 311l and the left bent segments 312a to 312k are shifted in the vertical direction. They are placed alternately in the vertical direction. A right bent segment and a left bent segment vertically adjacent thereto are joined together at their ends. Specifically, the upper end of a right bent segment and the lower end of a left bent segment are joined together, or the lower end of a right bent segment and the upper end of a left bent segment are joined together. For example, the upper left end of the right bent segment 311g is connected with the right lower end of the adjacent left bent segment 312g thereabove and the lower left end of the right bent segment 311g is connected with the right upper end of the adjacent left bent segment 312f therebelow.

The upper and lower lines of the right bent segments 311a to 311l are slanted toward the lower right and the upper and lower lines of the left bent segments 312a to 312k are slanted toward the lower left, so the first heater section 31 is bent at the joints of the segments. Namely, the first heater section 31 is bent upward at the middle, which is denoted by the dashed line DL2.

Next, the second heater section 32 will be described. As shown in FIG. 2, the second heater section 32 has a layout similar to that of the first heater section 31. The second heater section 32 is composed of a single heating wire, which extends in the vertical direction with multiple bends. Specifically, the second heater section 32 has a plurality of segments bent on the first heater section 31 side (the right side in FIG. 2). Furthermore, the second heater section 32 has a plurality of segments bent on the opposite side of the first heater section 31 (the left side in FIG. 2). Each left bent segments and each right bent segment are shifted in the vertical direction from each other and are connected alternately to form the second heater section 32.

Figure 4:
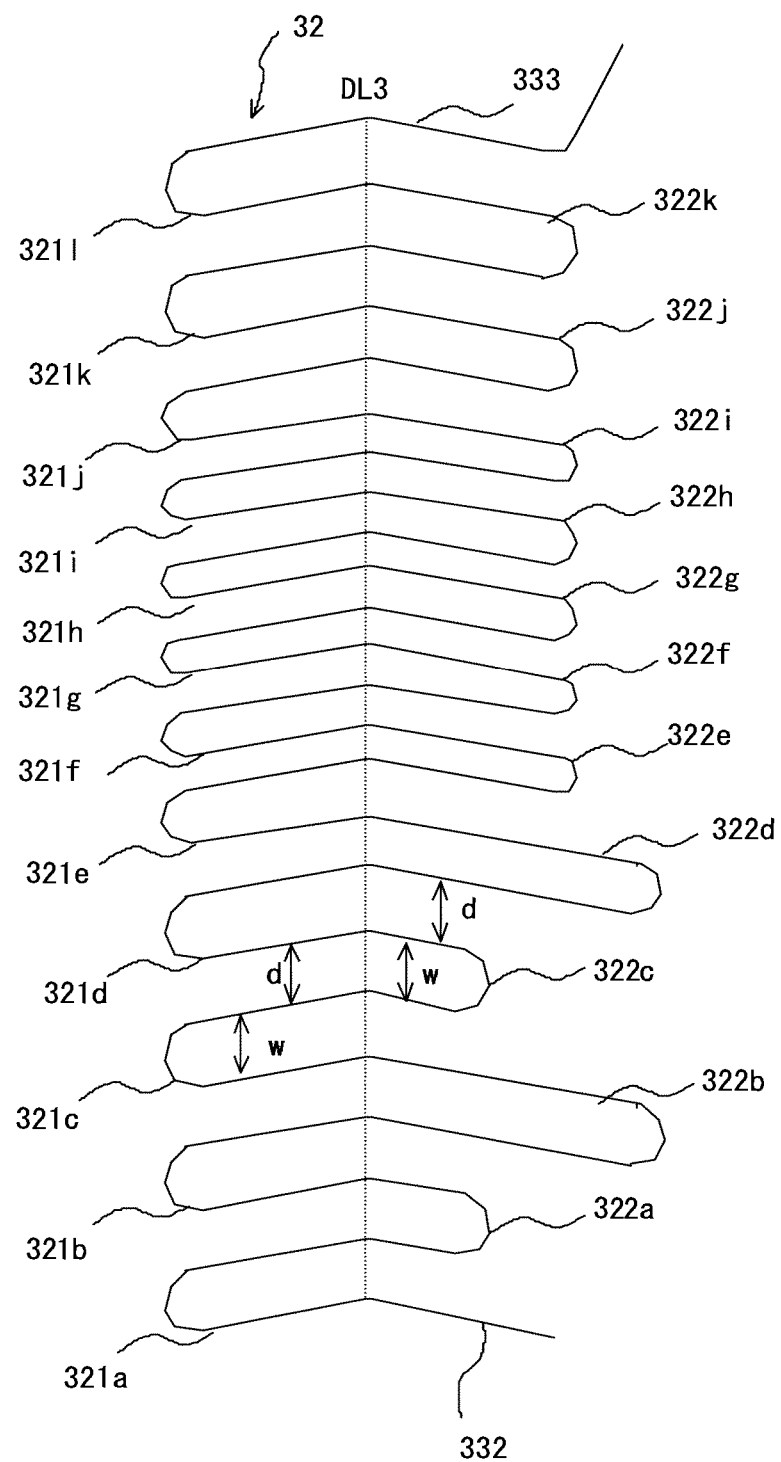
FIG. 4 is an enlarged view of a second heater section according to the preferred embodiment.

The configuration of the second heater section 32 will be described more specifically. FIG. 4 is an enlarged view of the second heater section 32. The second heater section 32 has twelve left bent segments 321a to 321l. In addition, the second heater section 32 has eleven right bent segments 322a to 322k. The left bent segments 321a to 321l are placed separately from one another in this order from the bottom to the top in the vertical direction. The right bent segments 322a to 322k are placed separately from one another in this order from the bottom to the top in the vertical direction. The left ends of the right bent segments 322a to 322k and the right ends of the left bent segments 321a to 321l are located on the dashed line DL3.

Each of the left bent segments 321a to 321l is U-shaped with straight parallel upper and lower lines and a circular arc bend formed on the left side. The upper line and the lower line are slanted toward the lower left. The upper lines of the left bent segments 321a to 321l have the same length, and the lower lines thereof have the same length, too. The right ends of the bent segments 321a to 321l are aligned vertically. The upper lines of the segments 321a to 321l are parallel, and the lower lines thereof are parallel, too. In the left bent segments 321a to 321l, the length of the upper and lower lines and the location of the right ends may be changed depending on the design.

Each of the right bent segments 322a to 322k is U-shaped with straight parallel upper and lower lines and a circular arc bend formed on the right side. The upper line and the lower line are slanted toward the lower right. The upper lines of the right bent segments 322a and 322c have the same length, and the lower lines thereof have the same length, too. The right ends of the bent segments 322a and 322c are aligned vertically. The upper lines of the right bent segments 322b and 322d have the same length, and the lower lines thereof have the same length, too. The right ends of the bent segments 322b and 322d are aligned vertically. The upper lines of the right bent segments 322e to 322k have the same length, and the lower lines thereof have the same length, too. The right ends of the bent segments 322e to 322k are aligned vertically.

The upper lines of the segments 322a to 322k are parallel, and the lower lines thereof are parallel, too. The segments 322b and 322d have the longest upper and lower lines, the segments 322a and 322c have the shortest upper and lower lines, and the segments 322e to 322k have upper and lower lines with an intermediate length. With regard to the right ends, the segments 322b and 322d are located closest to the center, the segments 322a and 322c are located farthest from the center, and the segments 322e to 322k are located therebetween. In the present configuration example, in the second heater section 32, all of the right bent segments and left bent segments are larger in the horizontal direction than in the vertical direction (the height).

The left bent segments 321a to 321l are provided on the left side of the right bent segments 322a to 322k. The left bent segments 321a to 321l and the right bent segments 322a to 322k are shifted in the vertical direction. They are placed alternately in the vertical direction. A left bent segment and a right bent segment vertically adjacent thereto are joined together at their ends. Specifically, the upper end of a left bent segment and the lower end of a right bent segment are joined together, or the lower end of a left bent segment and the upper end of a right bent segment are joined together.

Figure 5:
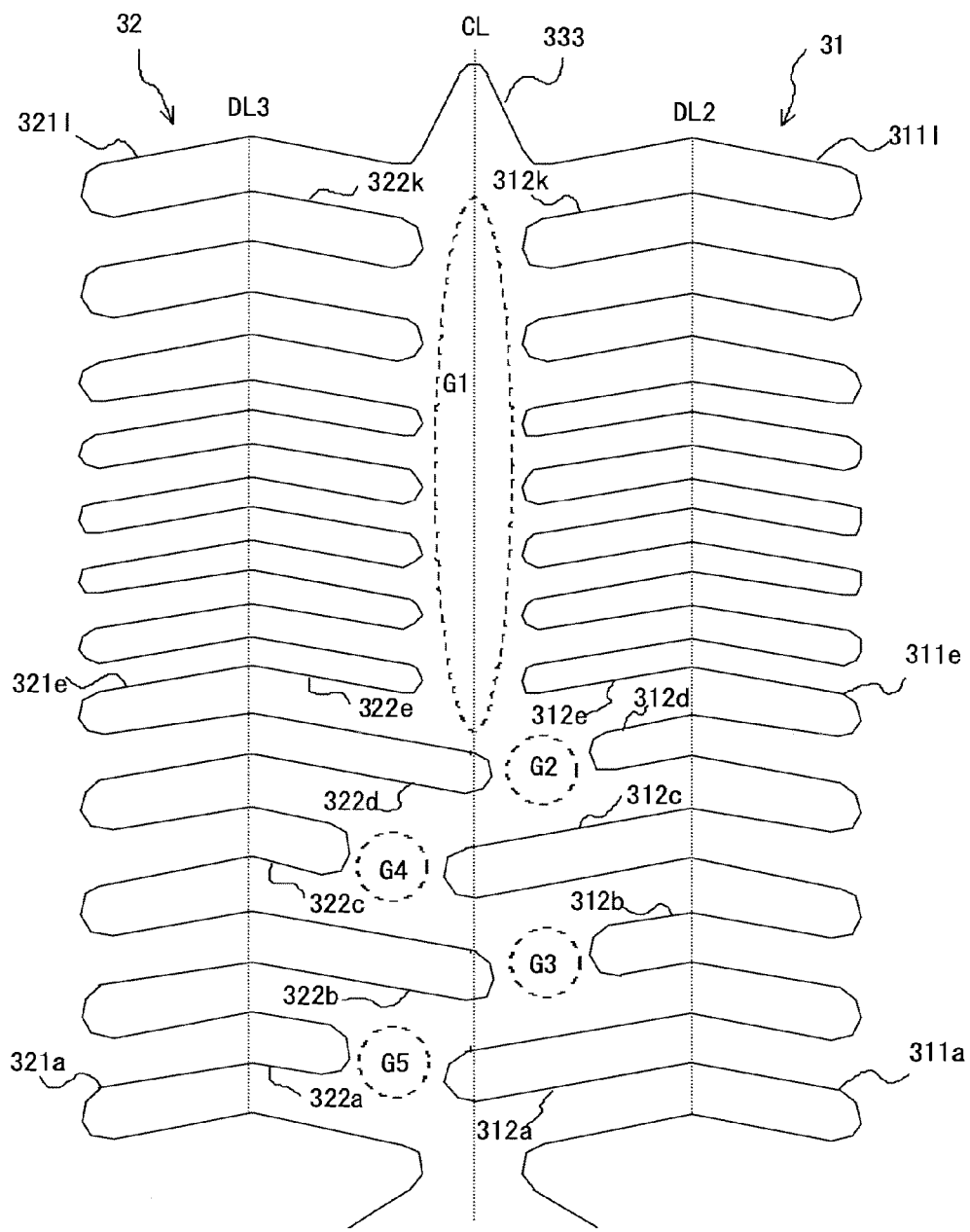
FIG. 5 is an enlarged view of the first heater section and the second heater section according to the preferred embodiment.

The relationship between the first heater section 31 and the second heater section 32 will be described. FIG. 5 is an enlarged view of the first heater section 31 and the second heater section 32. Reference numerals and symbols in the drawing are partly omitted. The left bent segments 321a to 321l of the second heater section 32 and the right bent segments 311a to 311l of the first heater section 31 are symmetrical about the center line CL between the first heater section 31 and the second heater section 32. Furthermore, the right bent segments 322e to 322k of the second heater section 32 and the left bent segments 312e to 312k of the first heater section 31 are symmetrical about the center line CL.

The right bent segments 322e to 322k of the second heater section 32 and the left bent segments 312e to 312k do not cross over the center line CL. In the middle area between them including the center line CL, a space (an area where a heating wire does not exist) G1 is provided. The right bent segments 322e to 322k are opposed to the left bent segments 312e to 312k, respectively, in the horizontal direction. When viewed in the vertical direction, the right bent segments 322e to 322k are not overlapped with but separate from the left bent segments 312e to 312k, and there is the space G1 between them.

On the other hand, the left bent segments 312a and 312c of the first heater section 31 extend leftward across the center line CL. The right bent segments 322b and 322d of the second heater section 32 extend rightward across the center line CL. The left bent segments 312a and 312c of the first heater section 31 are partially overlapped with the right bent segments 322b and 322d of the second heater section 32 when viewed in the vertical direction. In the present example, the left bent segments 312a and 312c are not overlapped with the other bent segments of the second heater section 32 when viewed in the vertical direction (they are separate in the horizontal direction), and the right bent segments 322b and 322d of the second heater section 32 are not overlapped with the other bent segments of the first heater section 31 when viewed in the vertical direction (they are separate in the horizontal direction).

The left bent segment 312a of the first heater section 31 is opposed to the right bent segment 322a of the second heater section 32, which is shorter than the segment 312a. There is a space G5 therebetween. The left bent segment 312c of the first heater section 31 is opposed to the right bent segment 322c of the second heater section 32, which is shorter than the segment 312c. There is a space G4 therebetween. The right bent segment 322b of the second heater section 32 is opposed to the left bent segment 312b of the first heater section 31, which is shorter than the segment 322b. There is a space G3 therebetween. The right bent segment 322d of the second heater section 32 is opposed to the left bent segment 312d of the first heater section 31, which is shorter than the segment 322d. There is a space G2 therebetween.

The spaces G4 and G5 are on the left side of the center line CL and the spaces G2 and G3 are on the right side of the center line CL. The spaces G2 to G5 are located different in the horizontal direction from the middle space G1, so that creasing in the heater unit 2 can be reduced. Furthermore, the spaces G4 and G5 are located different in the horizontal direction from the spaces G2 and G3, so that creasing can be reduced more effectively.

In the shown preferred configuration, from the left bent segment 312a of the first heater section 31 to the left bent segment 322d of the second heater section 32, each left bent segment of the first heater section 31 and each right bent segment of the second heater section 32 are placed alternately. In other words, on the center line CL, the right bent segment 322b of the second heater section 32 is interposed between the left bent segments 312a and 312c of the first heater section 31, and the left bent segment 312c of the first heater section 31 is interposed between the right bent segments 322b and 322d of the second heater section 32.

In this manner, the right bent segment 322b of the second heater section interposed between the spaces G4 and G5 separates these spaces, and the left bent segment 312c of the first heater section interposed between the spaces G2 and G3 separates these spaces. This configuration provides more effect for reducing formation of creases in the spaces G4, G5, G2 and G3.

Figure 6:
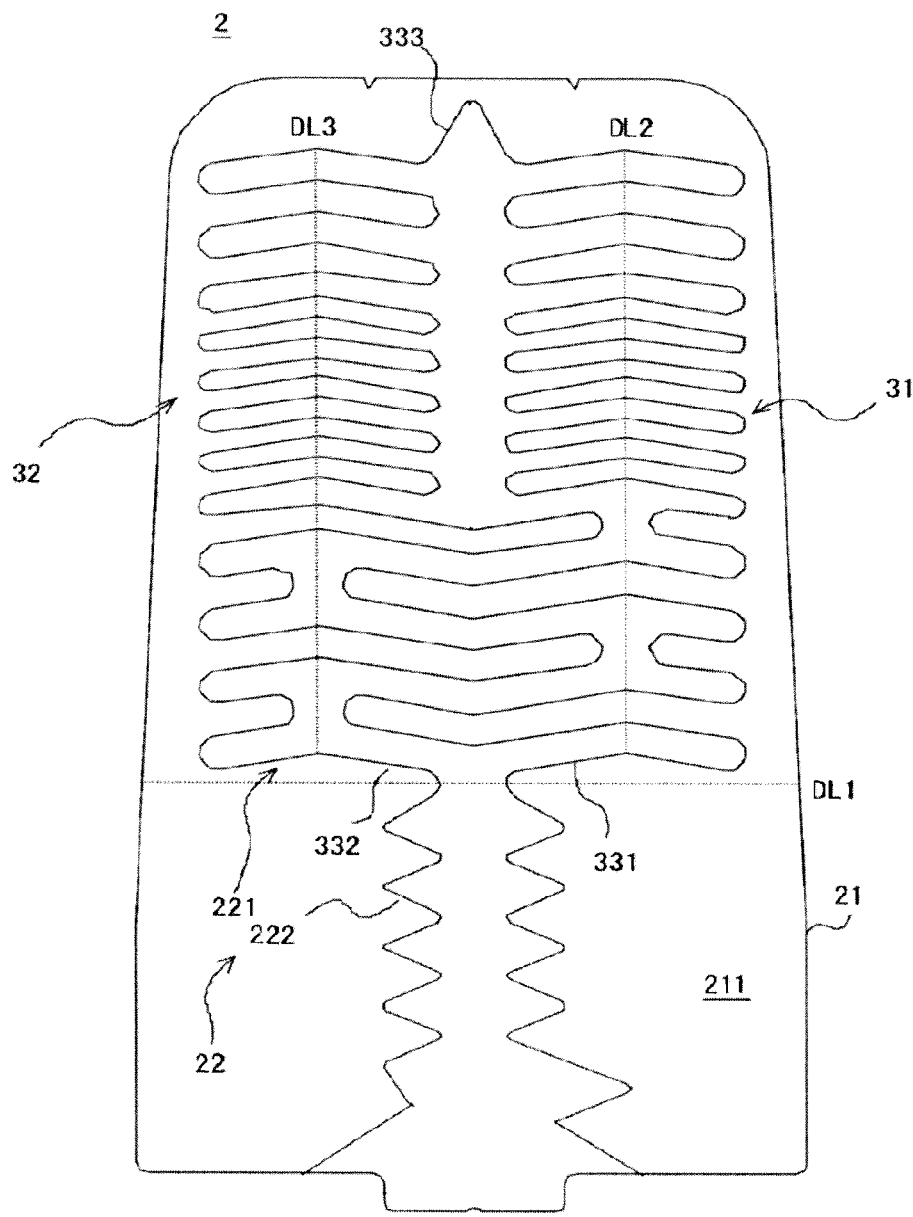
FIG. 6 is a plan view illustrating a heater unit having another heating wire layout according to the preferred embodiment of the present invention.
Figure 7:
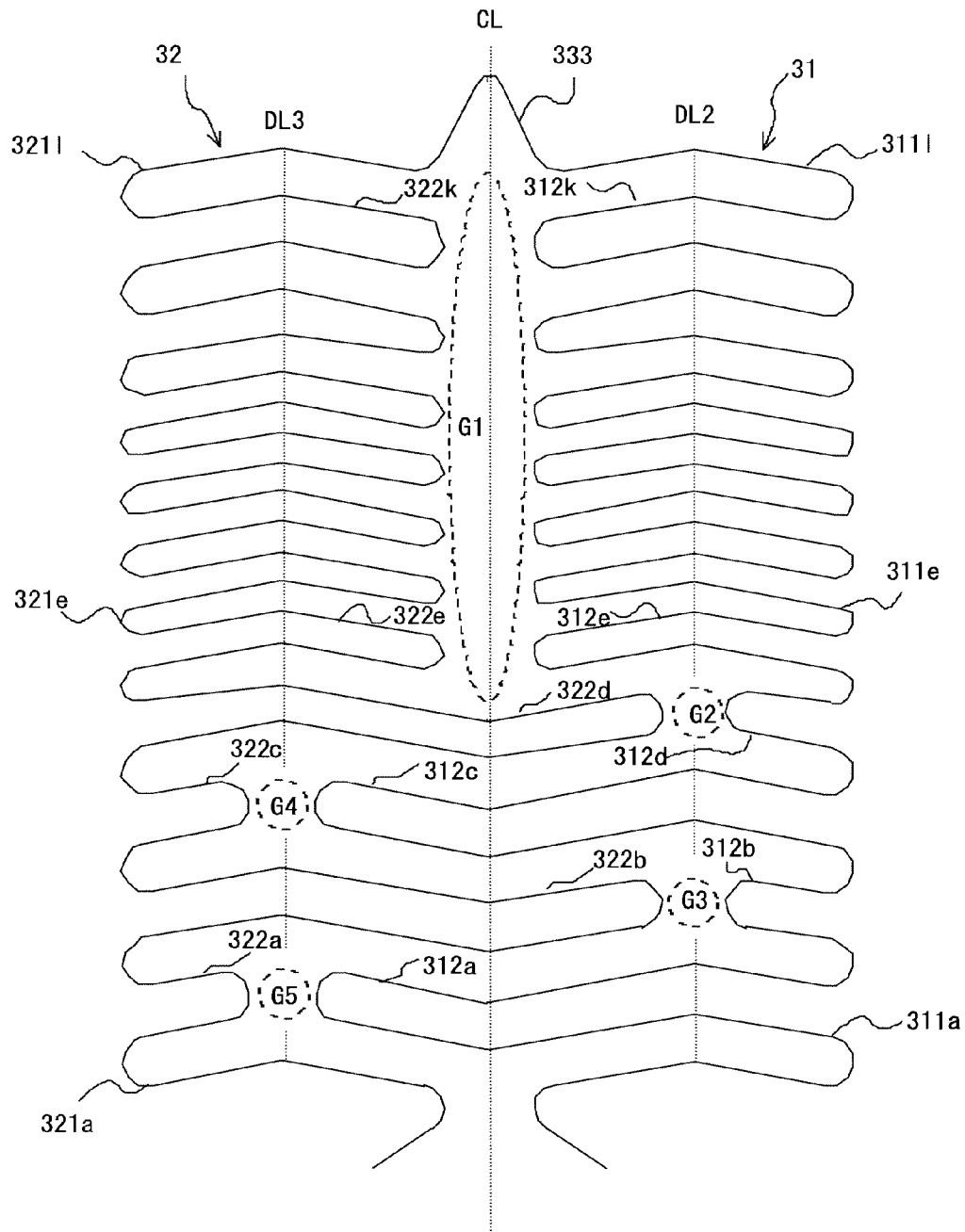
FIG. 7 is an enlarged view of the main heater part in FIG. 6.
Figure 8:
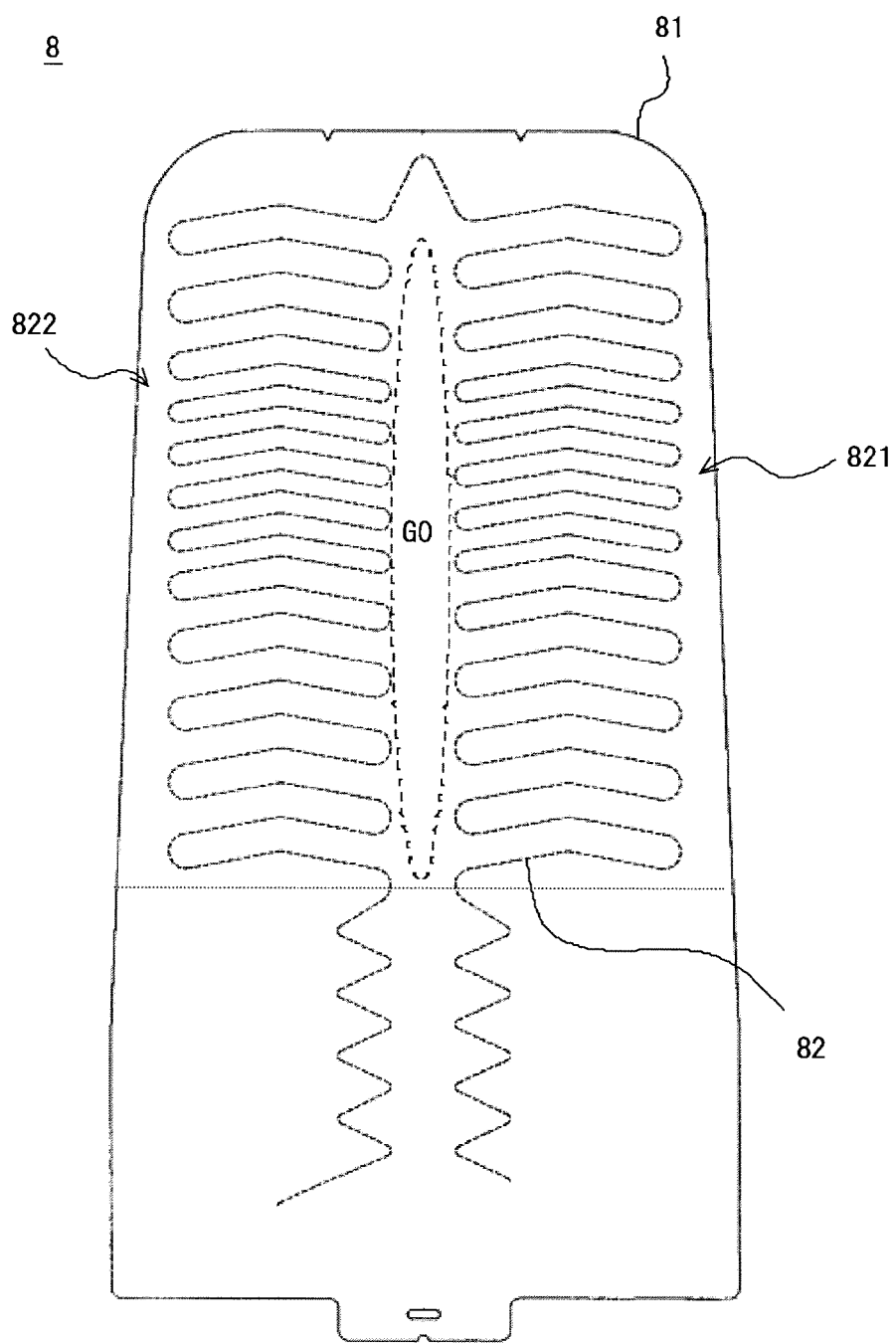
FIG. 8 is a perspective view illustrating the configuration of a heater unit according to a related art.
Figure 9:
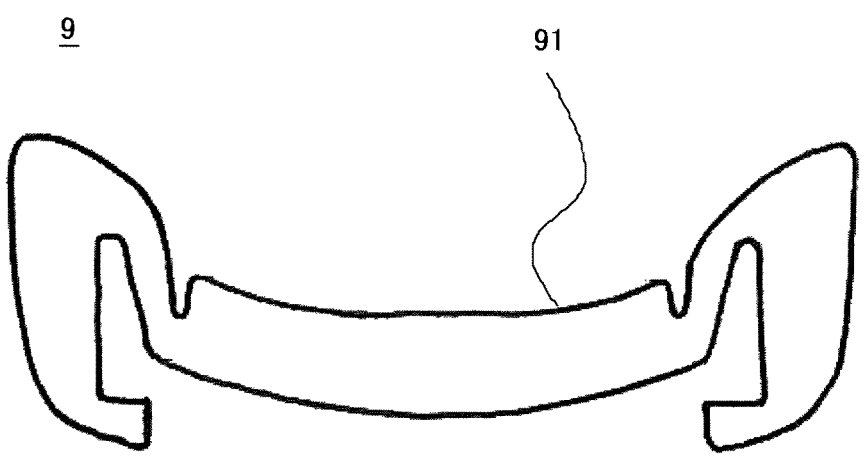
FIG. 9 is a cross-sectional view illustrating the structure of a seat back according to a related art.

Next, another preferred configuration of a heater unit 2 will be described. FIG. 6 is a plan view illustrating a heater unit 2 having another preferred heating wire layout. FIG. 7 is an enlarged view of the main heater part 221 in FIG. 6. In the present configuration, the structures in the part lower than the right bent segment 311e in the first heater section 31 and the part lower than the right bent segment 322d in the second heater section 32 are different from the one described with reference to FIGS. 2 to 5. Hereinafter, description will be given to the part different from the above-described configuration. A part of the reference numerals and symbols are omitted.

As illustrated in FIG. 7, in the present configuration, the left bent segments 312a and 312c of the first heater section 31 are longer and extend leftward further than the segments 312a and 312c in the configuration described above with reference to FIGS. 2 to 5. In conformity to their shape, the right bent segments 322a and 322c of the second heater section 32, which are horizontally aligned with and opposed to them, are shorter and end more left than the segments 322a and 322c in the above-described configuration. A space G5 is provided between the left bent segment 312a and the right bent segment 322a, and a space G4 is provided between the left bent segment 312c and the right bent segment 322c. The spaces G4 and G5 exist outer than the spaces G4 and G5 in the above-described configuration.

The left bent segments 312a and 312c of the first heater section 31 extend across the left end of the space G1, and when viewed in the vertical direction, they are overlapped with the right bent segments other than the two right bent segments 322a and 322c in the second heater section 32. In this manner, when viewed in the vertical direction, each of the left bent segments 312a and 312c is overlapped with the right bent segments 322b and 322d to 322k in the second heater section 32, which are located different in the vertical direction from the left bent segments 312a and 312c. This layout effectively reduces the formation of creases. The left bent segments 312a and 312c do not reach the bends at the middle of the second heater section 32. Between the spaces G4 and G5, a part of the second heater section 32 exists, which effectively reduces formation of creases.

Next, the right bent segments 322b and 322d of the second heater section 32 in FIGS. 6 and 7 are longer and extend rightward further than the segments 322b and 322d in the configuration described above with reference to FIGS. 2 to 5. In conformity to their shape, the left bent segments 312b and 312d of the first heater section 31, which are horizontally aligned with and opposed to them, are shorter and end more right than the segments 312b and 312d in the above-described configuration. A space G3 is provided between the right bent segment 322b and the left bent segment 312b, and a space G2 is provided between the right bent segment 322d and the left bent segment 312d. The spaces G2 and G3 exist outer than the spaces G2 and G3 in the above-described configuration.

The right bent segments 322b and 322d of the second heater section 32 extend across the right end of the space G1, and when viewed in the vertical direction, they are overlapped with the left bent segments other than the two left bent segments 312b and 312d in the first heater section 31. In this manner, when viewed in the vertical direction, each of the right bent segments 322b and 322d is overlapped with the left bent segments 312a, 312c, and 312e to 312k in the first heater section 31, which are located different in the vertical direction from the right bent segments 322b and 322d. This layout effectively reduces the formation of creases. The segments 322b and 322d do not reach the bends at the middle of the first heater section 31. Between the spaces G2 and G3, a part of the first heater section 31 exists, which effectively prevents formation of creases.

When viewed in the vertical direction, the spaces G4 and G5 are located so as to overlap with the bends at the middle of the second heater section 32. In other words, the horizontal location of the bends is within the widths of the spaces G4 and G5. In similar, when viewed in the vertical direction, the spaces G2 and G3 are located so as to overlap with the bends at the middle of the first heater section 31. Even if the heater unit 2 contracts in the space G4, G5, G2, and G3, this layout allows the bends to absorb the stress to the heating wire 22 to prevent break of the heating wire. For this reason, it is preferable that all of the spaces G2 to G5 be provided at these locations, but the effect can be obtained even if a part of them are located there.

The left bent segments 312a and 312c of the first heater section 31 are parallel to the other left bent segments of the first heater section 31 on the right side of the center line CL, and parallel to the right bent segments of the second heater section 32 on the left side of the center line CL. Each of the segments 312a and 312c has a downward bend on the center line CL. This layout can reduce unevenness in temperature in the heater unit 2. Besides, if creases are formed in the space G1, the layout allows the space G1 to absorb the stress to the heating wire 22.

Similarly, the right bent segments 322b and 322d of the second heater section 32 are parallel to the other right bent segments of the second heater section 32 on the left side of the center line CL, and parallel to the left bent segments of the first heater section 31 on the right side of the center line CL. Each of the segments 322b and 322d has a downward bend on the center line CL. This layout can reduce unevenness in temperature in the heater unit 2. Besides, if creases are formed in the space G1, the layout allows the space G1 to absorb the stress to the heating wire 22.

In the above-described two preferred configuration examples, the left ends of the left bent segments 312e to 312k in the first heater section 31 are aligned (at the same location in the horizontal direction) and located on the right side of the center line CL. The right ends of the right bent segments 322e to 322k in the second heater section 32 are aligned (at the same location in the horizontal direction) and located on the left side of the center line CL. Accordingly, a vertically extended large space G1 is present between these segments. In this area, a part of the left bent segments of the first heater section 31 and a part of the right bent segments of the second heater section 32 may extend across the center line CL. This layout divides the space G1, reducing formation of creases.

If bent segments are elongated so that the first heater section 31 and the second heater section 32 are overlapped when viewed in the vertical direction, the total length of the heating wire 22 becomes longer thereby. Accordingly, it is preferable to design the wiring layout so that the first heater section 31 and the second heater section 32 overlap in the requisite part where creases are likely to be formed. In this regard, the above two preferred configuration examples effectively reduces formation of creases while preventing the total length of the heating wire 22 from becoming unnecessarily long.

As set forth above, the present invention has been described by way of a preferred embodiment, but is not limited to the above-described embodiment. A person skilled in the art can easily modify, add, or convert each element in the above-described embodiment within the scope of the present invention. The present invention is not limited to the heating wire layouts described with reference to the drawings. For example, the first heater section and the second heater section are formed of independent heating wires.

It is sufficient if the first heater section and the second heater section extend with multiple bends, and the shapes of the right bent segments and the left bent segments are not limited to the above-described configuration. For example, the bent segments may be formed of curves. The right ends of the right bent segments in the first heater section are not necessarily aligned and the left ends of the left bent segments in the second heater section are not necessarily aligned. In these cases, the center line CL extends vertically through the midpoint between the rightmost end of the first heater section and the leftmost end of the second heater section. The present invention is applicable to a heating wire held by a trim cover or a pad. The segments 312b, 312d, 322a, and 322c may be omitted.

What is claimed is:

1. A heater unit to be used for a vehicle seat assembly comprising:
 a substrate;
 a first heater section comprising a single heating wire portion, extending in a first direction; and
 a second heater section comprising a single heating wire portion, extending in the first direction and provided at a location differing in a second direction from the first heater section, the second direction being perpendicular to the first direction,
 wherein the first heater section has a first end and a second end in the second direction, the first end of the first heater section being closer to the second heater section than the second end of the first heater section,
 wherein each of a first plurality of segments of the first heater section bent on the first end of the first heater section and each of a second plurality of segments bent on the second end of the first heater section are disposed in an alternating manner with each other in the first direction and are alternately connected with each other,
 wherein the second heater section has a first end and a second end in the second direction, the first end of the second heater section being closer to the first heater section than the second end of the second heater section,
 wherein each of a first plurality of segments of the second heater section bent on the first end of the second heater section and each of a second plurality of segments of the second heater section bent on the second end of second heater section are disposed in an alternating manner with each other in the first direction and are alternately connected with each other,
 wherein at least a part of the first plurality of segments of the first heater section extends across a center in the second direction between the first heater section and the second heater section, and
 wherein at least a part of the first plurality of segments of the second heater section extends across the center in the second direction between the first heater section and the second heater section.

2. The heater unit according to claim 1, wherein the part of the first plurality of segments of the second heater section are a plurality of segments bent on the first end of the second heater section;
 wherein the part of the first plurality of segments of the first heater section are a plurality of segments bent on the first end of the first heater section; and
 wherein each of the first plurality of segments bent on the first end of the second heater section extending across the center and each of the first plurality of segments bent on the first end of the first heater section extending across the center are disposed in an alternating manner with each other in the first direction.

3. The heater unit according to claim 1, wherein the part of the first plurality of segments bent on the first end of the second heater section are at least partially overlapped with the first plurality of segments bent on the first end of the first heater section located differently in the first direction therefrom when viewed in the first direction; and
 wherein the part of the first plurality of segments bent on the first end of the first heater section are at least partially overlapped with the first plurality of segments bent on the first end of the second heater section located differently in the first direction therefrom when viewed in the first direction.

4. The heater unit according to claim 1, wherein the first heater section and the second heater section constitute a part of a single heating wire.

5. The heater unit according to claim 1, wherein a part of the first plurality of segments of the second heater section and a part of the first plurality of segments of the first heater section end before the center and there is a space therebetween.

6. The heater unit according to claim 1, wherein, in the first heater section, each of the first plurality of segments bent on the first end of the first heater section and each of the second plurality of segments bent on the second end of the first heater section are joined so as to form a first plurality of bends;
 wherein, in the second heater section, each of the first plurality of segments bent on the first end of the second heater section and each of the second plurality of segments bent on the second end of the second heater section are joined so as to form a second plurality of bends;
 wherein a first space exists between one of the first plurality of segments and one of the first plurality of segments of the second heater section extended across the center,
 wherein the first space is located so as to overlap with the first plurality of bends in the first heater section when viewed in the first direction; and
 wherein a second space exists between one of the first plurality of segments of the first heater section extended across the center and one of the first plurality of segments of the second heater section, and
 wherein the second space is located so as to overlap with the second plurality of bends in the second heater section when viewed in the first direction.

7. A vehicle seat assembly comprising:
 a seat back covered with a seat back trim cover;
 a seat cushion covered with a seat cushion trim cover; and
 a heater unit mounted within the seat back trim cover or the seat cushion trim cover,
 wherein the heater unit comprises:
  a substrate;
  a first heater section comprising a single heating wire portion, extending in a first direction; and
  a second heater section comprising a single heating wire portion, extending in the first direction and provided at a location differing in a second direction from the first heater section, the second direction being perpendicular to the first direction,
 wherein the first heater section has a first end and a second end in the second direction, the first end of the first heater section being closer to the second heater section than the second end of the first heater section,
 wherein each of a first plurality of segments of the first heater section bent on the first end of the first heater section and each of a second plurality of segments bent on the second end of the first heater section are disposed in an alternating manner with each other in the first direction and are alternately connected with each other,
 wherein the second heater section has a first end and a second end in the second direction, the first end of the second heater section being closer to the first heater section than the second end of the second heater section,
 wherein each of a first plurality of segments of the second heater section bent on the first end of the second heater section and each of a second plurality of segments of the second heater section bent on the second end of second heater section are disposed in an alternating manner with each other in the first direction and are alternately connected with each other, wherein at least a part of the first plurality of segments of the first heater section extends across a center in the second direction between the first heater section and the second heater section, and wherein at least a part of the first plurality of segments of the second heater section extends across the center in the second direction between the first heater section and the second heater section.

8. The vehicle seat assembly according to claim 7, wherein the part of the first plurality of segments of the second heater section are a plurality of segments bent on the first end of the second heater section;

wherein the part of the first plurality of segments of the first heater section are a plurality of segments bent on the first end of the first heater section; and wherein each of the first plurality of segments bent on the first end of the second heater section extending across the center and each of the first plurality of segments bent on the first end of the first heater section extending across the center are disposed in the alternating manner with each other in the first direction.

9. The vehicle seat assembly according to claim 7, wherein the part of the first plurality of segments bent on the first end of the second heater section are at least partially overlapped with the first plurality of segments bent on the first end of the first heater section located differently in the first direction therefrom when viewed in the first direction; and wherein the part of the first plurality of segments bent on the first end of the first heater section are at least partially overlapped with the first plurality of segments bent on the first end of the second heater section located differently in the first direction therefrom when viewed in the first direction.

10. The vehicle seat assembly according to claim 7, wherein the first heater section and the second heater section constitute a part of a single heating wire.

11. The vehicle seat assembly according to claim 7, wherein a part of the first plurality of segments of the second heater section and a part of the first plurality of segments of the first heater section end before the center and there is a space therebetween.

12. The vehicle seat assembly according to claim 7, wherein, in the first heater section, each of the first plurality of segments bent on the first end of the first heater section and each of the second plurality of segments bent on the second end of the first heater section are joined so as to form a first plurality of bends;

wherein, in the second heater section, each of the first plurality of segments bent on the first end of the second heater section and each of the second plurality of segments bent on the second end of the second heater section are joined so as to form a second plurality of bends;

wherein a first space exists between one of the first plurality of segments of the first heater section and one of the first plurality of segments of the second heater section extended across the center, wherein the first space is located so as to overlap with the first plurality of bends in the first heater section when viewed in the first direction; and wherein a second space exists between one of the first plurality of segments of the first heater section extended across the center and one of the first plurality of segments of the second heater section, and wherein the second space is located so as to overlap with the second plurality of bends in the second heater section when viewed in the first direction.

* * * * *